US011424462B2

(12) United States Patent
Janarthanam et al.

(10) Patent No.: US 11,424,462 B2
(45) Date of Patent: Aug. 23, 2022

(54) METHOD OF OPERATING A FUEL CELL DURING A SOAK TIME PERIOD

(71) Applicant: Ford Global Technologies, LLC, Dearborn, MI (US)

(72) Inventors: Suriyaprakash Ayyangar Janarthanam, Westland, MI (US); Victor Dobrin, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 329 days.

(21) Appl. No.: 16/819,628

(22) Filed: Mar. 16, 2020

(65) Prior Publication Data
US 2020/0220183 A1    Jul. 9, 2020

Related U.S. Application Data

(63) Continuation of application No. 15/826,004, filed on Nov. 29, 2017, now abandoned, which is a continuation-in-part of application No. 12/899,156, filed on Oct. 6, 2010, now abandoned.

(51) Int. Cl.
| | |
|---|---|
| *H01M 8/04303* | (2016.01) |
| *H01M 8/04955* | (2016.01) |
| *H01M 8/04225* | (2016.01) |
| *H01M 8/04089* | (2016.01) |
| *H01M 8/04746* | (2016.01) |
| *H01M 8/1018* | (2016.01) |
| H01M 8/10 | (2016.01) |

(52) U.S. Cl.
CPC ... *H01M 8/04303* (2016.02); *H01M 8/04089* (2013.01); *H01M 8/04225* (2016.02); *H01M 8/04753* (2013.01); *H01M 8/04761* (2013.01); *H01M 8/04955* (2013.01); *H01M 8/1018* (2013.01); *H01M 2008/1095* (2013.01); *H01M 2250/20* (2013.01); *Y02T 90/40* (2013.01)

(58) Field of Classification Search
CPC ......... H01M 8/04303; H01M 8/04089; H01M 8/04225; H01M 8/04753; H01M 8/04761; H01M 8/04955; H01M 8/1018; H01M 2008/1095; H01M 2250/20
See application file for complete search history.

(56) References Cited

U.S. PATENT DOCUMENTS

| | | | |
|---|---|---|---|
| 5,260,143 | A | 11/1993 | Voss et al. |
| 6,093,502 | A | 7/2000 | Carlstrom, Jr. et al. |
| 6,809,060 | B2 | 10/2004 | Suh et al. |

(Continued)

FOREIGN PATENT DOCUMENTS

| | | |
|---|---|---|
| JP | 57145276 A | 9/1982 |
| JP | 5258762 A | 10/1993 |

(Continued)

*Primary Examiner* — Stewart A Fraser
(74) *Attorney, Agent, or Firm* — Brooks Kushman P.C.

(57) ABSTRACT

A method of operating a fuel cell. The method includes closing a cathode inlet valve upstream of an inlet of a cathode of the fuel cell to prevent air from entering the fuel cell through the cathode inlet during a shutdown period and a soak period of the fuel cell. The method includes maintaining an anode outlet valve downstream of an outlet of the anode in a closed state to prevent air from leaking into the fuel cell through the anode outlet during the shutdown period and the soak period of the fuel cell.

20 Claims, 5 Drawing Sheets

(56) References Cited

U.S. PATENT DOCUMENTS

| | | |
|---|---|---|
| 6,864,000 B2 | 3/2005 | Resnick et al. |
| 6,887,610 B2 | 5/2005 | Elhamid et al. |
| 6,939,633 B2 | 9/2005 | Goebel |
| 7,141,324 B2 | 11/2006 | Margiott et al. |
| 7,425,379 B2 | 9/2008 | Joos |
| 2002/0076582 A1 | 6/2002 | Reiser et al. |
| 2002/0102443 A1* | 8/2002 | Yang ............... H01M 8/04761 429/432 |
| 2002/0114984 A1 | 8/2002 | Edlund et al. |
| 2002/0155336 A1 | 10/2002 | Acker |
| 2003/0235747 A1 | 12/2003 | Haltiner, Jr. et al. |
| 2003/0235752 A1 | 12/2003 | England et al. |
| 2005/0026022 A1 | 2/2005 | Joos |
| 2005/0136302 A1 | 6/2005 | Shoji et al. |
| 2006/0003205 A1 | 1/2006 | Yoshida et al. |
| 2006/0008689 A1 | 1/2006 | Yonekura et al. |
| 2006/0014074 A1 | 1/2006 | Tsuji et al. |
| 2007/0026277 A1 | 2/2007 | Ogawa et al. |
| 2007/0042239 A1 | 2/2007 | Chang et al. |
| 2007/0087233 A1 | 4/2007 | Biaszcyk et al. |
| 2007/0099040 A1 | 5/2007 | Morita et al. |
| 2007/0122664 A1 | 5/2007 | Spare |
| 2007/0154742 A1 | 7/2007 | Tang et al. |
| 2007/0154751 A1 | 7/2007 | Katano |
| 2008/0038595 A1 | 2/2008 | Buchi et al. |
| 2008/0152972 A1 | 6/2008 | Igarashi et al. |
| 2008/0160371 A1 | 7/2008 | Spahr et al. |
| 2008/0206610 A1 | 8/2008 | Saunders et al. |
| 2008/0233443 A1 | 9/2008 | Jacobsen et al. |
| 2008/0286613 A1 | 11/2008 | Furukawa |
| 2009/0035630 A1 | 2/2009 | Kumada et al. |

FOREIGN PATENT DOCUMENTS

| | | |
|---|---|---|
| JP | 6251788 A | 9/1994 |
| JP | 2000012062 A | 1/2000 |
| JP | 2002093448 A | 3/2002 |
| JP | 2005026067 A | 1/2005 |
| JP | 2005116353 A | 4/2005 |
| JP | 2005183042 A | 7/2005 |
| JP | 2005228481 A | 8/2005 |
| JP | 2005293857 A | 10/2005 |
| JP | 2006286558 A | 10/2006 |
| JP | 2006351270 A | 12/2006 |
| JP | 2007149360 A | 6/2007 |
| JP | 2007305404 A | 11/2007 |
| WO | 2007107838 A2 | 9/2007 |

* cited by examiner

METHOD OF OPERATING A FUEL CELL DURING A SOAK TIME PERIOD

CROSS-REFERENCE TO RELATED APPLICATIONS

This application is a continuation of U.S. application Ser. No. 15/826,004 filed Nov. 29, 2017 (now abandoned), which is a continuation-in-part of U.S. application Ser. No. 12/899,156 filed Oct. 6, 2010 (now abandoned), the disclosures of which are hereby incorporated in their entirety by reference herein.

TECHNICAL FIELD

The present disclosure relates to methods of operating a fuel cell during a soak time period.

BACKGROUND

In a typical proton exchange membrane (PEM) based fuel cell system, an anode subsystem provides the necessary hydrogen fuel at the pressure, flow, and humidity to a fuel cell stack for necessary power generation.

During the normal operation of the fuel cell system, when a vehicle ignition key is turned on, the chemical reaction at an anode catalyst layer on an anode side of the fuel cell system involves splitting a hydrogen into an electron and proton. The protons permeate through the membrane to the cathode side. On the cathode side of the membrane, oxygen atoms react with the protons to produce water.

During a soak time period between a shutdown of normal operations and a restart of normal operations, some or all of the remaining unreacted hydrogen on the anode side migrates through the membrane and chemically reacts with the oxygen in the cathode side. Over time, depending upon the length of soak, hydrogen depletes in the anode side. Oxygen or air from the cathode side fills in the anode side to replace the lost hydrogen and increases an anode half cell potential. The oxygen may cause carbon corrosion and ruthenium migration from an anode catalyst layer to a cathode catalyst layer. These processes of corrosion and migration may each result in decreased fuel cell stack life.

SUMMARY

In a first embodiment, a method of operating a fuel cell is disclosed. The method includes closing a cathode inlet valve upstream of an inlet of a cathode of the fuel cell to prevent air from entering the fuel cell through the cathode inlet during a shutdown period and a soak period of the fuel cell. The method further includes maintaining an anode outlet valve downstream of an outlet of the anode in a closed state to prevent air from leaking into the fuel cell through the anode outlet during the shutdown period and the soak period of the fuel cell.

In a second embodiment, a method of operating a fuel cell is disclosed. The method includes closing first and second valves located upstream and downstream of an inlet and outlet of the cathode of the fuel cell, respectively, during a shutdown period and a soak period of the fuel cell, and pressurizing the fuel cell cathode to a pressurized pressure to maintain a half cell potential of the anode of less than 1.2 volts during the shutdown period and the soak period of the fuel cell.

In another embodiment, a method of operating a fuel cell including is disclosed. The method includes closing a cathode inlet valve upstream of an inlet of a cathode of the fuel cell to prevent air from entering the fuel cell through the cathode inlet during a shutdown period and a soak period of the fuel cell; and closing an anode outlet valve downstream of an outlet of an anode of the fuel cell to prevent air from leaking into the fuel cell through the anode outlet during the shutdown period and the soak period of the fuel cell.

DETAILED DESCRIPTION

Figure 1:
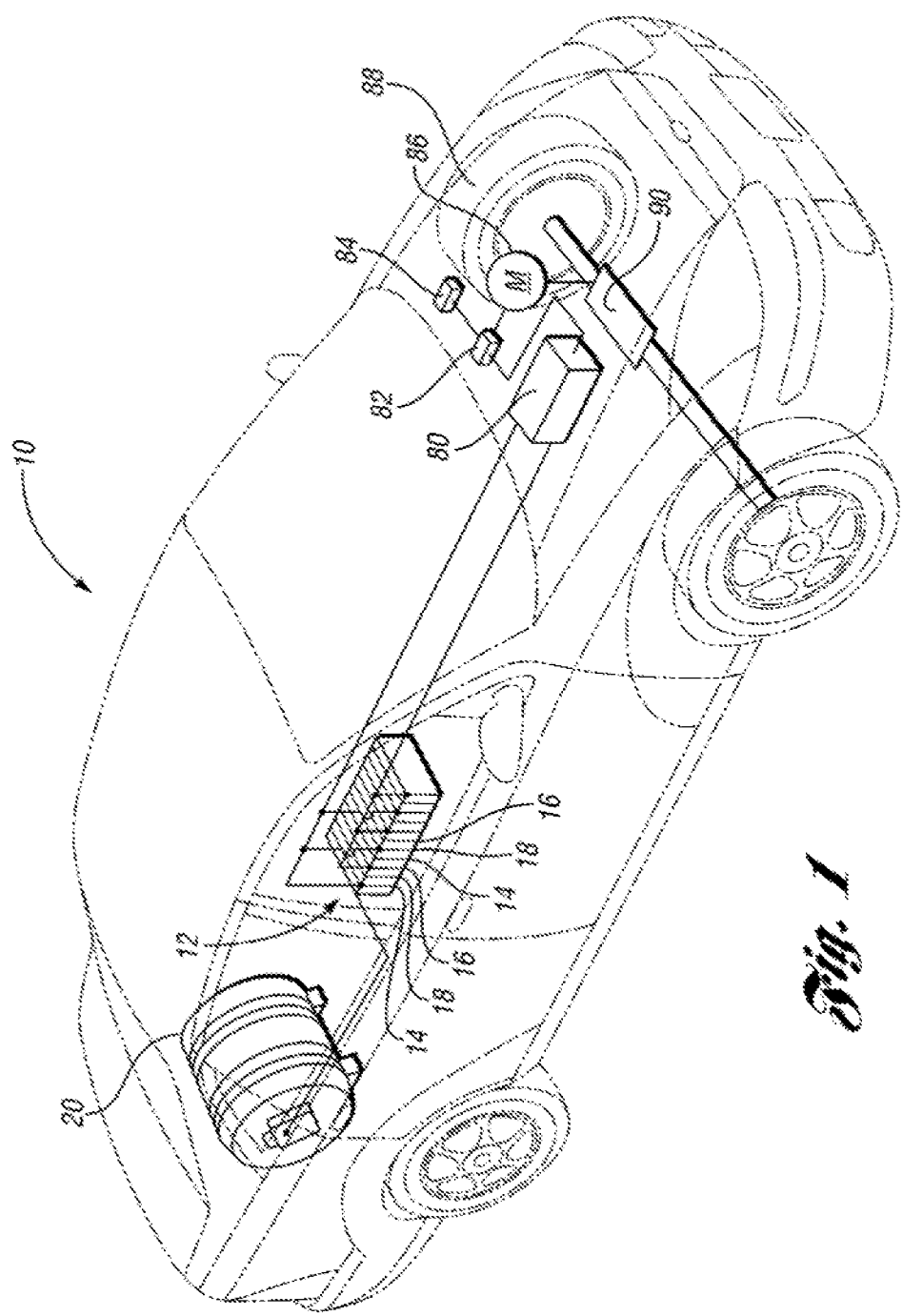
FIG. 1 schematically illustrates a fuel cell system in a vehicle according to at least one embodiment.

Reference will now be made in detail to presently preferred compositions, embodiments and methods of the present invention, which constitute the best modes of practicing the invention presently known to the inventors. However, it should be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the operating examples, or where otherwise expressly indicated, all numbers in this description indicating material amounts, reaction conditions, or uses are to be understood as modified by the word "about" in describing the invention's broadest scope. Practice within the numerical limits stated is generally preferred. The term "about" may be used herein to describe disclosed or claimed embodiments. The term "about" may modify a value disclosed or claimed in the present disclosure. In such instances, "about" may signify that the value it modifies is within ±0%, 0.1%, 0.5%, 1%, 2%, 3%, 4%, 5% or 10% of the value.

Also, unless expressly stated to the contrary: percent and ratio values are by weight; a material group or class described as suitable or preferred for a given purpose in connection with the invention implies any two or more of these materials may be mixed and be equally suitable or preferred; constituents described in chemical terms refer to the constituents at the time of addition to any combination specified in the description, and does not preclude chemical interactions among mixture constituents once mixed; an acronym's first definition or other abbreviation applies to all subsequent uses here of the same abbreviation and mutatis mutandis to normal grammatical variations of the initially defined abbreviation; and unless expressly stated to the contrary, measurement of a property is determined by the same technique as previously or later referenced for the same property.

In a typical proton exchange membrane (PEM) based fuel cell system, an anode subsystem provides the necessary hydrogen fuel at the pressure, flow, and humidity to a fuel cell stack for necessary power generation.

During the normal operation of the fuel cell system, when a vehicle ignition key is turned on, the chemical reaction at an anode catalyst layer on an anode side of the fuel cell system involves splitting a hydrogen into an electron and proton. The protons permeate through the membrane to the cathode side. On the cathode side of the membrane, oxygen atoms react with the protons to produce water.

During a soak time period between a shutdown of normal operations and a restart of normal operations, some or all of the remaining unreacted hydrogen on the anode side migrates through the membrane and chemically reacts with the oxygen in the cathode side. Over time, depending upon the length of soak, hydrogen depletes in the anode side because of this migration. Oxygen or air from the cathode side fills in the anode side to replace the lost hydrogen and increases an anode half cell potential.

Increasing the anode half cell potential destabilizes a ruthenium component of the anode catalyst layer, which may result in ruthenium migrating to the cathode catalyst. Loss of ruthenium on the anode catalyst layer may result in less efficient permeation of protons and may reduce the life of the fuel cell stack. It is desirable to prevent oxygen and air from migrating to the anode side.

Regarding FIG. 1, a vehicle 10 is illustrated with a fuel cell 12 for powering the vehicle 10. While the vehicle 10 shown is a car, it should be understood that the vehicle 10 may also be other forms of transportation such as a truck, off-road vehicle, or an urban vehicle. The fuel cell 12 comprises an anode 14, a cathode 16, and a membrane 18 therebetween. A fuel cell stack comprises a plurality of such cells 12 wired serially and/or in parallel.

Fuel cell 12 electrically communicates with and provides energy to a high voltage bus 80. High voltage bus 80 electrically communicates with and provides energy to a d.c.-to-d.c. converter 82. The d.c.-to-d.c. converter 82 electrically communicates with both a battery 84 and a traction motor 86. The traction motor 86 is connected to a wheel 88 connected to the vehicle's 10 frame 90.

Further, while the fuel cell 12 is illustrated as supplying power for the traction motor 86, the fuel cell 12 may be used to power other aspects of the vehicle 10 without departing from the spirit or scope of the invention.

Connected directly or indirectly to the fuel cell 12 is a primary fuel source 20, such as a primary hydrogen source like an onboard hydrocarbon reformer. Non-limiting examples of the primary hydrogen source is a high-pressure hydrogen storage tank, an onboard hydrocarbon reformer, or a hydride storage device.

Figure 2:
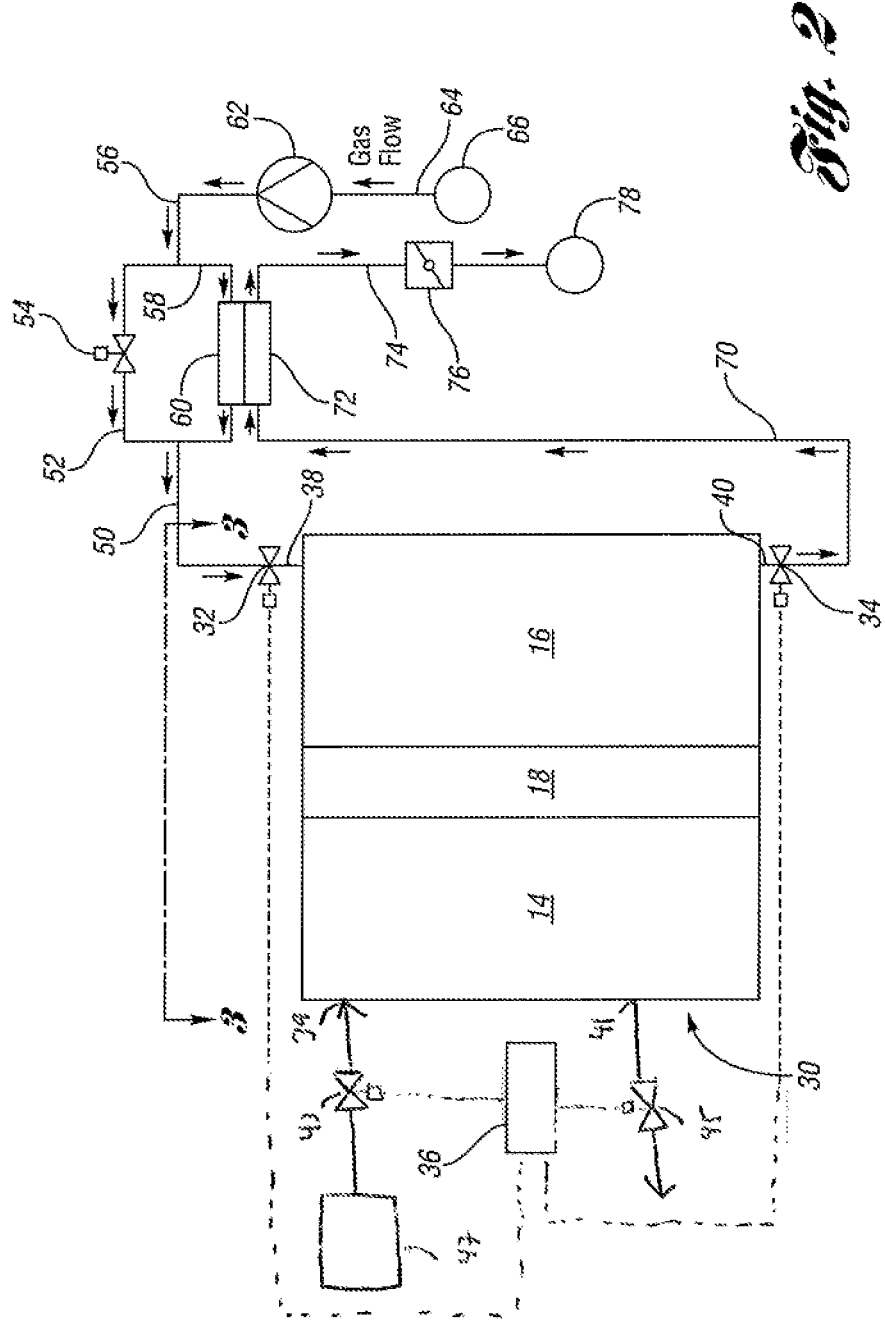
FIG. 2 schematically illustrates a fuel cell system according to at least one embodiment.

Regarding FIG. 2, a fuel cell 30 includes anode 14 and cathode 16 separated by membrane 18. Connected to cathode 16 is an input valve 32 for controlling the flow of air and/or oxygen. Also connected to cathode 16 is an output valve 34 which controls the flow of gas exiting the cathode 16. Valves 32 and 34 communicate with controller 36 which in at least one embodiment, controls the flow of gasses through the valves during opened and closed operational conditions.

Valves 32 and 34 may include, but are not limited to, gate valves, check valves, needle valves, ball valves, powered valves, reducing valves and plug valves. In at least one embodiment, input valve 32 is disposed upstream of the cathode. Valve 32 may be disposed as close to cathode 32 as possible to minimize the retained oxygen in the conduit 38, such as a pipe, situated between valve 32 and cathode 16. Similarly, in at least one embodiment, valve 34 is situated as closely as possible to cathode 16 such that conduit 40 has a minimal volume of retained gas.

Supplying air to valve 32 is an air supply conduit 50 which divides into a bypass conduit 52 which has a valve 54 disposed between conduit 50 and main oxygen supply 56. Main oxygen supply 56 also supplies conduit 58 into one side of a humidifier 60. Oxygen exits humidifier 60 and rejoins conduit 50. Conduit 56 is supplied pressurized air and/or oxygen by air compressor 62. Compressor 62 is supplied with air and/or oxygen through conduit 64 from a fuel source 66. Fuel source 66 may supply air, oxygen, and/or other fuels for the fuel cell.

Gas exiting from cathode 16 passes through conduit 40 and valve 34 and proceeds through conduit 70 to a second portion of 72 of humidifier 60. Gas coming from compressor 62 does not mix with gas coming from conduit 70 in humidifier 60. Gas exiting humidifier portion 72 passes through conduit 74 to a back pressure throttle valve 76. Gas passing through back pressure throttle valve 76 is directed to the vehicle exhaust system 78 where it leaves the fuel cell system.

Valves 43 and 45 may be situated upstream and downstream the inlet and outlet 39 and 41 of the anode 14, respectively. The valves may be gate valves, check valves, needle valves, ball valves, powered valves, reducing valves and plug valves. During the soak time period, valve 45 may be closed to close the anode outlet 39 to eliminate leaking of air (including oxygen) back into the fuel cell stack during the entire shutdown period and soak time period. If the anode outlet is left open on the exhaust side, then as the hydrogen permeates through the membrane, air is drawn in the anode exhaust line and once it reaches the anode catalyst it quickly reacts with the remaining hydrogen. This undesired result is reduced or eliminated by closing anode exhaust valve 45 during a soak period. The anode valves 43 and 45 may be controlled by the controller 36. In one embodiment, valve 43 remains open during a portion of or the entire shutdown and soak time periods. In an alternative embodiment, valve 43 is closed during a portion of the entire shutdown and soak time periods.

Figure 3:
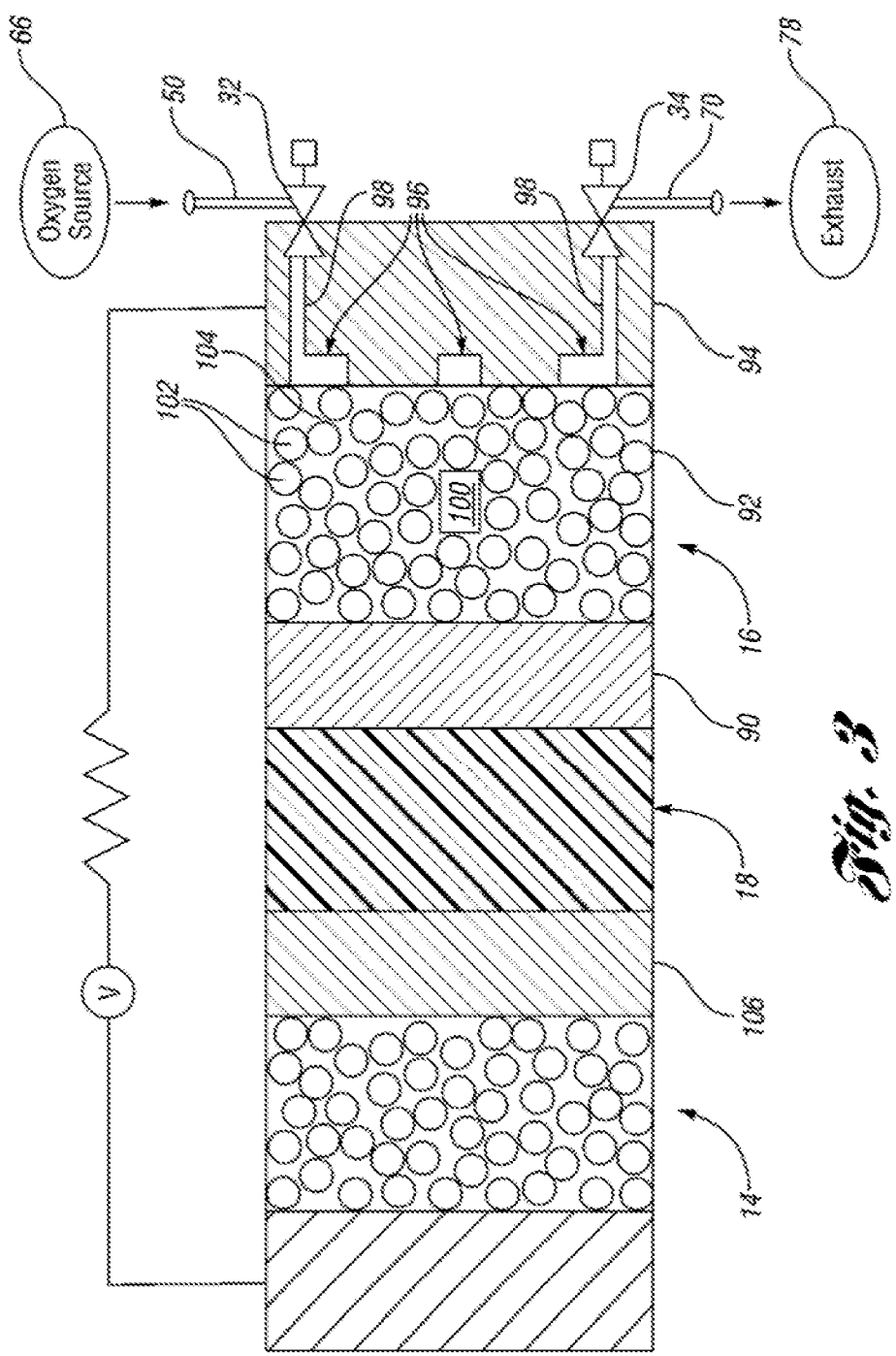
FIG. 3 schematically illustrates cross-sectional view of a fuel cell along axis 3-3 of FIG. 2.

Turning now to FIG. 3, a cross-sectional view of the fuel cell is schematically illustrated according to at least one embodiment. Cathode 16 comprises a cathode catalyst 90 adjacent to membrane 18. Spaced apart from membrane 18 and adjacent to cathode catalyst 90 is gas diffusion layer 92. Adjacent to gas diffusion layer 92 is a plate 94. Plate 94 defines gas conduit 96 which is embedded into plate 94 and communicating with gas diffusion layer 92. Gas conduit 96 includes a pass-through gas conduit 98, which passes through the thickness of the plate 94. In at least one embodiment, the input valve 32 connects directly to the pass-through conduit 98 making pass-through conduit 98 identical to conduit 38. Input valve 32 receives oxygen or other fuel through conduit 50. Output valve 34 is connected to the other end of conduit 98 making conduit 98 identical to conduit 40. Conduit 70 exits valve 34 and directs the gas to exhaust 78.

Cathode catalyst 90 and plate 94 define cavity 100 into which gas diffusion layer 92 is situated. Between gas diffusion layer particles 102 are interstices 104. The volume of interstices 104 and gas conduit 96 and pass-through conduit 98 form a retained oxygen volume of cathode 16. In one or more embodiments, the retained oxygen volume is minimized during the soak time period.

Cathode catalyst 90 may facilitate reaction of hydrogen with the retained oxygen according to equation 1.

$$4H^+ + 4e^- + O_2 \rightarrow 2H_2O \qquad [1]$$

Any unused oxygen of the retained oxygen may migrate across the catalyst layer 90 and membrane 18 to react with a anode catalyst layer 106. Reaction with anode catalyst layer 106 arises because of corrosion of a carbon component of anode catalyst layer 106.

The carbon corrosion reaction definition is given in equation 2.

$$C + 2H_2O \rightarrow CO_2 + 4H^+ + 4e^- \quad [2]$$

A degradation rate of the carbon component of anode catalyst layer 106 increases with increasing a half-cell potential of the carbon catalyst layer 106. Carbon corrosion in certain embodiments begins at a half-cell potential greater than 0.29 volts. In another embodiment, carbon corrosion begins at a half cell potential greater than 0.5 volts. In yet another embodiment, carbon corrosion begins at a half-cell potential greater than 1.2 volts. Carbon corrosion may result in loss of fuel cell performance and may shorten the stack life of the fuel cell 30.

Anode catalyst layer 106 also has a ruthenium compound component. When the anode half cell potential exceeds 0.55 volts, the ruthenium compound component of the anode catalyst layer 106 becomes unstable and starts migrating towards cathode 16. The ruthenium deposits on cathode catalyst layer 90. The reaction is defined as given below in equation 3.

$$Ru \rightarrow Ru^{3+} + 3e^- \quad [3]$$

In one or more embodiments, the objective is to minimize the ruthenium in this cathode catalyst layer 90. The deposition of ruthenium on cathode catalyst layer 90 may result in reduced rates of oxidation reduction reactions at the cathode catalyst layer 90. Loss of ruthenium on the anode catalyst layer 106 may result in less efficient permeation of protons through the anode catalyst layer 106. The net result of the ruthenium migration may be a shorter stack life of the fuel cell 30.

In at least one embodiment, the fuel cell system can be operated when a vehicle propulsion system transitions to a non-operational condition, such as a soak time period from an operational condition, such as a propulsion system operating time period. The fuel cell system, in another embodiment, may be used when a vehicle propulsion system transitions to the operational condition from the non-operational condition. In one embodiment, a shutdown period starts immediately after an operational period of the fuel cell ends and ends immediately before a soak period starts, and the soak period ends immediately before an operational period of the fuel cell starts.

Figure 4:
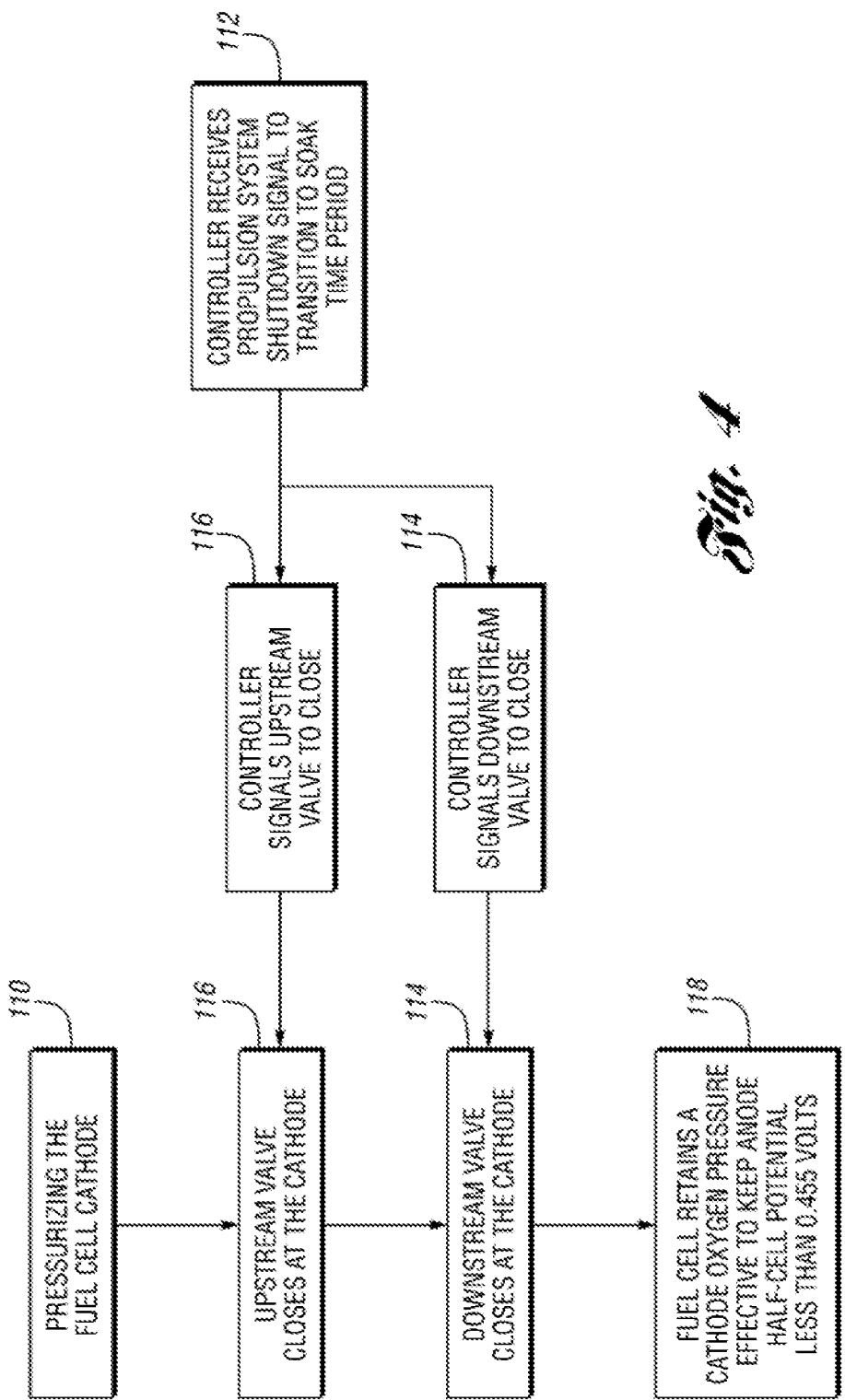
FIG. 4 diagrammatically illustrates a method of use of a fuel cell system according to at least one embodiment.

The method includes steps of pressurizing the fuel cell cathode with oxygen in step 110 of FIG. 4. These steps as well as any other steps set forth herein may be performed by a controller. The oxygen is supplied through the oxygen inlet valve 32. In step 112, controller 36 receives a first signal to transition to a soak time period operational condition. In step 114, the controller transmits a second signal to valve 34 closing valve 34. Closing both valves 32 and 34 prevent entry of oxygen into the fuel stack during a soak period. In at least one embodiment, the signal is directly or indirectly transmitted from a propulsion system electrical system. The controller also transmits another signal in step 116 to valve 32 closing valve 32.

In at least one embodiment, during the soak period, the anode half cell potential is maintained at less than 0.455 volts in step 118. In another embodiment, the anode half cell potential is less than 0.85 volts. In yet another embodiment, the anode half cell potential is kept to less than 1.2 volts.

The cathode oxygen pressure in at least one embodiment decreases or remains the same during the soak time period.

In one embodiment, the cathode oxygen pressure is a pressurized pressure, which is higher than the pressure during at least a portion of the operational period.

In another embodiment, a valve, e.g., a shutoff or blocking valve, may be disposed on the conduit going to the fuel cell cathode side inlet. The cathode inlet valve may be closed at the start of and during the entire shutdown or soak time period (ending when normal operation of the fuel cell is restarted) to prevent air filtration (to avoid oxygen infiltration) through the inlet side of the cathode during shutdown and subsequent off state of the fuel cell. A check valve is not included on the cathode inlet conduit. Such a valve would open during shutdown allowing additional air to flow into the fuel cell module during shutdown when the fuel cell stack falls below an air pressure of the ambient pressure.

In this embodiment, a valve, e.g., a shutoff or blocking valve, may not be used on the conduit coming from the fuel cell cathode outlet (or may be open if one is included). A turbine may be located on this side of the stack to provide flow restriction. Also, on the fuel cell cathode outlet side, the cathode exhaust gases close to the stack have only about 8% to 10% oxygen, and thus, there is less of a concern of oxygen infiltrating from this direction. By having a strong shutoff valve on at least one side (inlet side in one embodiment), advective flow, for example from wind, during the off state, is essentially prevented or minimized. This embodiment provides a balance of limited oxygen infiltration and also limited cost (by not having the cost (and complexity, volume, etc.) of a second valve). Moreover, in this embodiment, the anode inlet and outlet valves may be closed during shutdown and the entire soak time period. Alternatively, only the anode outlet valve is closed to prevent leakage of air into the fuel cell stack during all of shutdown and the entire soak time period.

In yet another embodiment, particularly those not having a turbine and/or having a requirement for a very long life, a cathode outlet valve can be used and closed in addition to closing a cathode inlet valve for pressure control and for air shutoff during shutdown and off states (soak period), to reduce oxygen infiltration and carbon corrosion degradation. In such an embodiment, an anode inlet and/or outlet valve may be open during at least a portion of the shutoff and soak periods (or not be utilized in the system). Alternatively, an anode inlet and/or outlet valve may be closed during at least a portion of the shutoff and soak periods.

In one or more embodiments, the cathode and/or the anode is not purged during shutdown or the soak time period. In one or more embodiments, the fuel flow through the anode is not maintained during any portion of shutdown or the soak time period. Rather, the cathode and/or anode is isolated immediately after the operational state concludes and shutdown begins. Also, no purge may take place during the end of or any portion of the operational state.

Figure 5:
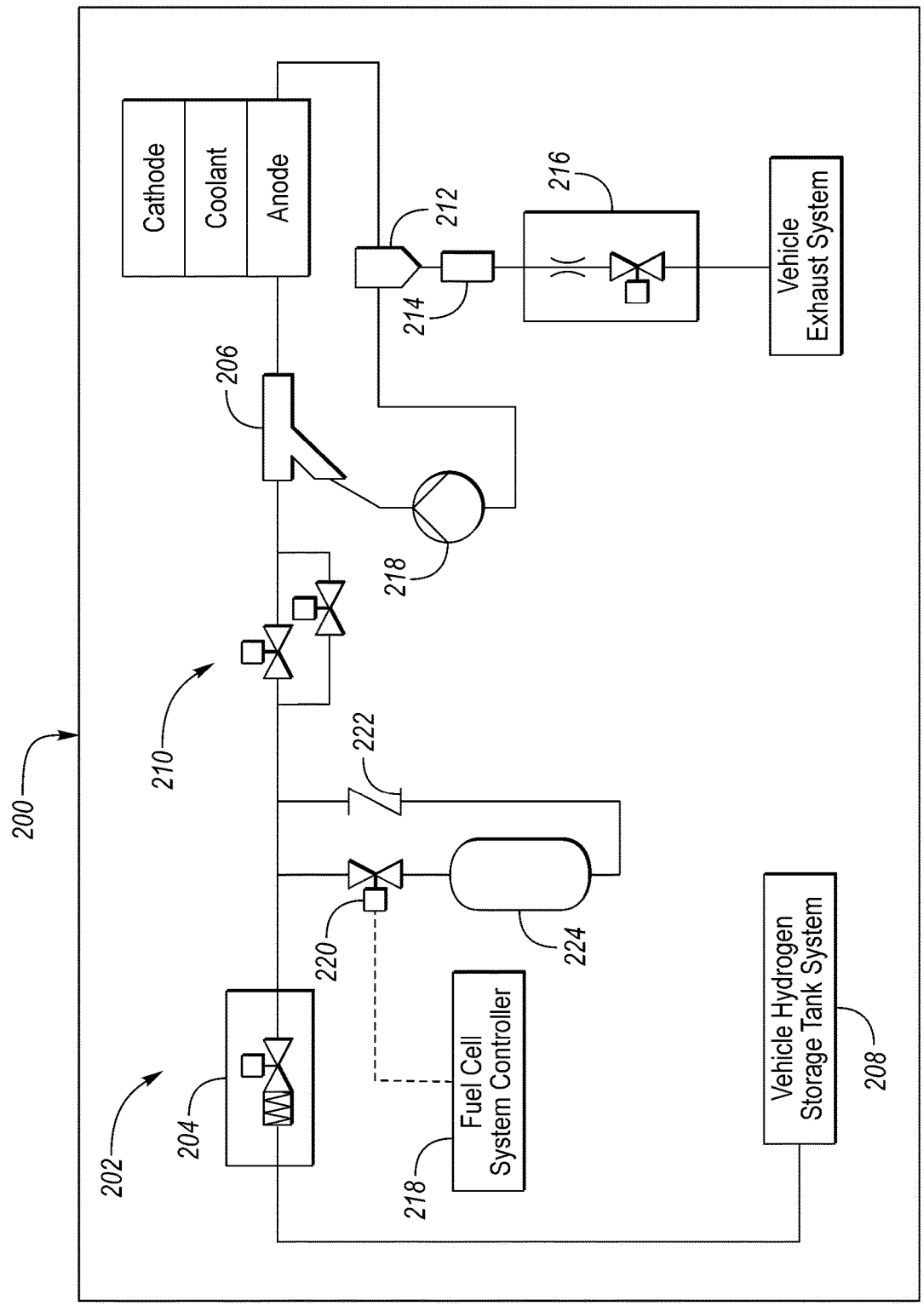
FIG. 5 schematically illustrates an anode side of a fuel cell system according to at least one embodiment.

FIG. 5 is a schematic of an anode side 200 of a fuel cell system 202 according to one embodiment. A fuel supply is enabled through a system isolation valve 204, which may be an on-off device that allows or shuts off the fuel supply when needed. At mixing chamber 206 a recirculated anode exhaust gas mixture may be mixed homogeneously with a feed gas. The required hydrogen fuel (i.e., feed gas) is supplied from a vehicle storage tank 208 under a pressurized condition. The anode side 200 also includes a pressure control device 210 to control anode gas mixture pressure at the stack inlet, and a water knock out 212 to knock out all the liquid water from the anode recirculation gas mixture. Purge device 214 purges anode recirculation gas mixture whenever the need arises to maintain certain levels of hydrogen concentration in the anode recirculation loop. Drain valve 216 drains out all knocked out liquid water. Recirculation device 218 increases the flow of recirculation gas mixture before it mixed with the fresh feed of hydrogen fuel. Fuel cell system controller 218 can control fill enable valve 220. Check valve 222 is in the in loop buffer hydrogen storage tank system 224. Valves 204 and 206 can be controlled or used as set forth in embodiments of this application.

The controller may be a processor or microprocessor that is embodied in a computer system. The computer system may further include memory, RAM and input device(s). The computer system may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the computers may be configured to execute a computer-program that is embodied in a non-transitory computer readable medium that is programmed to perform any number of the functions as disclosed. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The system bus may be any of several types of bus structure that may further interconnect to a memory bus (with or without a memory controller), a peripheral bus, and a local bus using any of a variety of commercially available bus architectures. The system memory may include read only memory (ROM) and/or random access memory (RAM). A basic input/output system (BIOS) is stored in a non-volatile memory such as ROM, EPROM, EEPROM, which BIOS contains the basic routines that help to transfer information between elements within the computer, such as during start-up. The RAM may also include a high-speed RAM such as static RAM for caching data.

A number of program modules may be stored in the drives and RAM, including an operating system, one or more application programs, other program modules and program data. All or portions of the operating system, applications, modules, and/or data may also be cached in the RAM. It is appreciated that the subject matter of the present disclosure may be implemented with various commercially available operating systems or combinations of operating systems.

The computer may operate in a networked environment using logical connections via wired and/or wireless communications to one or more remote computers. The remote computer(s) may be a workstation, a server computer, a router, a personal computer, a portable computer, a personal digital assistant, a cellular device, a microprocessor-based entertainment appliance, a peer device or other common network node, and may include many or all of the elements described relative to the computer. The logical connections depicted include wired/wireless connectivity to a local area network (LAN) and/or larger networks, for example, a wide area network (WAN). Such LAN and WAN networking environments are commonplace in offices, and companies, and facilitate enterprise-wide computer networks, such as intranets, all of which may connect to a global communications network such as the Internet.

Although the best mode for carrying out the invention has been described in detail, those familiar with the art to which this invention relates will recognize various alternative designs and embodiments for practicing the invention as defined by the following claims.

What is claimed is:

1. A method of operating a fuel cell comprising:
closing a cathode inlet valve upstream of an inlet of a cathode of the fuel cell to prevent air from entering the fuel cell through the cathode inlet during a shutdown period and a soak period of the fuel cell; and
maintaining an anode outlet valve downstream of an outlet of the anode in a closed state to prevent air from leaking into the fuel cell through the anode outlet during the shutdown period and the soak period of the fuel cell.

2. The method of claim 1, further comprising restricting flow of oxygen on the outlet side of the cathode via a turbine located on the outlet side of the cathode during the shutdown period and the soak period of the fuel cell.

3. The method of claim 1, wherein the closing steps reduce migration of a ruthenium component from the anode to the cathode during the shutdown and soak time periods.

4. The method of claim 1, wherein the cathode inlet valve is a blocking valve.

5. The method of claim 1, wherein an outlet side of the cathode does not include a valve to restrict or prevent the flow of oxygen during the shutdown and soak time periods of the fuel cell.

6. The method of claim 1, wherein the shutdown and soak time periods are at least a portion of the entire shutdown and soak time periods.

7. The method of claim 1, wherein the shutdown and soak time periods are a portion of the entire shutdown and soak time periods.

8. A method of operating a fuel cell comprising:
closing first and second valves located upstream and downstream of an inlet and outlet of the cathode of the fuel cell, respectively, during a shutdown period and a soak period of the fuel cell; and
pressurizing the fuel cell cathode to a pressurized pressure to maintain a half cell potential of the anode of less than 1.2 volts during the shutdown period and the soak period of the fuel cell.

9. The method of claim 8, wherein the pressurized pressure decreases during the soak period.

10. The method of claim 8, wherein the pressurized pressure is maintained during the soak period.

11. The method of claim 8, wherein the pressurized pressure is higher than a pressure during an operational time period of the fuel cell.

12. The method of claim 8, wherein the half cell potential of the anode is less than 0.85 volts.

13. The method of claim 8, wherein the half cell potential of the anode is less than 0.455 volts.

14. The method of claim 8, wherein the closing step prevents entry of oxygen into the anode and the cathode during the soak time period.

15. A method of operating a fuel cell comprising:
closing a cathode inlet valve upstream of an inlet of a cathode of the fuel cell to prevent air from entering the fuel cell through the cathode inlet during a shutdown period and a soak period of the fuel cell; and
closing an anode outlet valve downstream of an outlet of an anode of the fuel cell to prevent air from leaking into the fuel cell through the anode outlet during the shutdown period and the soak period of the fuel cell.

16. The method of claim 15, further comprising restricting flow of oxygen on an outlet side of the cathode via a turbine located on the outlet side of the cathode during the shutdown period and the soak period of the fuel cell.

17. The method of claim 15, wherein the closing steps reduce migration of a ruthenium component from the anode to the cathode during the shutdown and soak time periods.

18. The method of claim 15, wherein the cathode inlet valve is a blocking valve.

19. The method of claim 15, wherein an outlet side of the cathode does not include a valve to restrict or prevent the flow of oxygen during the shutdown and soak time periods of the fuel cell.

20. The method of claim 15, wherein the shutdown period starts immediately after an operational period of the fuel cell ends and ends immediately before the soak period starts, and the soak period ends immediately before an operational period of the fuel cell starts.

\* \* \* \* \*